United States Patent
Essick, IV et al.

(10) Patent No.: US 7,945,768 B2
(45) Date of Patent: May 17, 2011

(54) METHOD AND APPARATUS FOR NESTED INSTRUCTION LOOPING USING IMPLICIT PREDICATES

(75) Inventors: Raymond B. Essick, IV, Glen Ellyn, IL (US); Kent D. Moat, Winfield, IL (US); Michael A. Schuette, Wilmette, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 470 days.

(21) Appl. No.: 12/133,885

(22) Filed: Jun. 5, 2008

(65) Prior Publication Data
US 2009/0307472 A1    Dec. 10, 2009

(51) Int. Cl.
*G06F 9/00* (2006.01)
(52) U.S. Cl. .......................................................... 712/241
(58) Field of Classification Search ................. 712/241
See application file for complete search history.

(56) References Cited

U.S. PATENT DOCUMENTS

| | | |
|---|---|---|
| 3,718,912 A | 2/1973 | Hasbrouck et al. |
| 4,128,880 A | 12/1978 | Cray, Jr. |
| 4,744,043 A | 5/1988 | Kloker |
| 4,760,545 A | 7/1988 | Inagami et al. |
| 4,807,183 A | 2/1989 | Kung et al. |
| 4,825,361 A | 4/1989 | Omoda et al. |
| 4,918,600 A | 4/1990 | Harper, III et al. |
| 5,021,945 A | 6/1991 | Morrison et al. |
| 5,206,822 A | 4/1993 | Taylor |
| 5,317,734 A | 5/1994 | Gupta |
| 5,367,494 A | 11/1994 | Shebanow et al. |
| 5,390,352 A | 2/1995 | Kinoshita |
| 5,418,953 A | 5/1995 | Hunt et al. |
| 5,423,040 A | 6/1995 | Epstein et al. |
| 5,450,607 A | 9/1995 | Kowalczyk et al. |
| 5,495,617 A | 2/1996 | Yamada |
| 5,542,084 A | 7/1996 | Lowe, Jr. |
| 5,652,909 A | 7/1997 | Kodosky |
| 5,697,788 A | 12/1997 | Ohta |
| 5,717,947 A | 2/1998 | Gallup et al. |
| 5,719,998 A | 2/1998 | Ku et al. |
| 5,734,863 A | 3/1998 | Kodosky et al. |
| 5,742,821 A | 4/1998 | Prasanna |
| 5,764,787 A | 6/1998 | Nickerson |
| 5,790,877 A | 8/1998 | Nishiyama et al. |

(Continued)

OTHER PUBLICATIONS

Hennessy and Patterson, Computer Architecture A Quantitative Approach, 1996, Morgan Kaufmann Publishers, Inc., Second Edition, pp. 239-247.

(Continued)

*Primary Examiner* — Jacob Petranek

(57) ABSTRACT

A method and apparatus for executing a nested program loop on a vector processor, the loop comprising outer-pre, inner and outer-post portions. An input stream unit of the vector processor provides a data value to a data path and sets an associated data validity tag to 'valid' once per outer loop iteration, as indicated by an inner counter of the input stream unit. The tag is set to 'invalid' in other iterations. Functional units of the vector processor operate on data values in the data path, each functional unit producing a valid result if the data validity tags associated with inputs data values are set to 'valid'. An output stream unit of the vector processor sinks a data value from the data path once per outer loop iteration if an associated data validity tag indicates that the data value is valid.

18 Claims, 7 Drawing Sheets

U.S. PATENT DOCUMENTS

| | | | |
|---|---|---|---|
| 5,790,880 | A | 8/1998 | Ireton |
| 5,805,614 | A | 9/1998 | Norris |
| 5,821,934 | A | 10/1998 | Kodosky et al. |
| 5,826,080 | A | 10/1998 | Dworzecki |
| 5,852,729 | A | 12/1998 | Limberis et al. |
| 5,881,257 | A | 3/1999 | Glass et al. |
| 5,881,263 | A | 3/1999 | York et al. |
| 5,887,183 | A | 3/1999 | Agarwal et al. |
| 5,893,143 | A | 4/1999 | Tanaka et al. |
| 5,936,953 | A | 8/1999 | Simmons |
| 5,958,048 | A * | 9/1999 | Babaian et al. ............... 712/241 |
| 5,966,528 | A | 10/1999 | Wilkinson et al. |
| 5,969,975 | A | 10/1999 | Glass et al. |
| 5,999,736 | A | 12/1999 | Gupta et al. |
| 6,052,766 | A | 4/2000 | Betker et al. |
| 6,064,819 | A | 5/2000 | Franssen et al. |
| 6,104,962 | A | 8/2000 | Sastry |
| 6,112,023 | A | 8/2000 | Dave et al. |
| 6,128,775 | A | 10/2000 | Chow et al. |
| 6,173,389 | B1 | 1/2001 | Pechanek et al. |
| 6,192,384 | B1 | 2/2001 | Dally et al. |
| 6,192,515 | B1 * | 2/2001 | Doshi et al. .................. 717/161 |
| 6,202,130 | B1 | 3/2001 | Scales, III et al. |
| 6,230,317 | B1 * | 5/2001 | Wu ............................... 717/161 |
| 6,253,372 | B1 | 6/2001 | Komatsu et al. |
| 6,370,560 | B1 | 4/2002 | Robertazzi et al. |
| 6,381,687 | B2 | 4/2002 | Sandstrom et al. |
| 6,430,671 | B1 | 8/2002 | Smith |
| 6,437,804 | B1 | 8/2002 | Ibe et al. |
| 6,442,701 | B1 | 8/2002 | Hurd |
| 6,490,612 | B1 | 12/2002 | Jones et al. |
| 6,513,107 | B1 | 1/2003 | Ansari |
| 6,571,016 | B1 | 5/2003 | Mehrotra et al. |
| 6,588,009 | B1 | 7/2003 | Guffens et al. |
| 6,598,221 | B1 | 7/2003 | Pegatoquet et al. |
| 6,629,123 | B1 | 9/2003 | Hunt |
| 6,647,546 | B1 | 11/2003 | Hinker et al. |
| 6,665,749 | B1 | 12/2003 | Ansari |
| 6,732,354 | B2 | 5/2004 | Ebeling et al. |
| 6,745,160 | B1 | 6/2004 | Gupta et al. |
| 6,792,445 | B1 | 9/2004 | Jones et al. |
| 6,795,908 | B1 | 9/2004 | Lee et al. |
| 6,799,261 | B2 | 9/2004 | May et al. |
| 6,850,536 | B2 | 2/2005 | May et al. |
| 6,898,691 | B2 | 5/2005 | Blomgren et al. |
| 6,912,709 | B2 | 6/2005 | Helder et al. |
| 6,934,938 | B2 | 8/2005 | May et al. |
| 7,000,232 | B2 | 2/2006 | Jones et al. |
| 7,010,788 | B1 | 3/2006 | Rehg et al. |
| 7,100,019 | B2 | 8/2006 | Norris et al. |
| 7,140,019 | B2 | 11/2006 | May et al. |
| 7,159,099 | B2 | 1/2007 | Lucas et al. |
| 7,200,738 | B2 | 4/2007 | Crook et al. |
| 7,272,704 | B1 | 9/2007 | Nguyen et al. |
| 7,275,148 | B2 | 9/2007 | Moyer et al. |
| 7,290,122 | B2 | 10/2007 | May et al. |
| 7,475,231 | B2 * | 1/2009 | Tran ............................. 712/241 |
| 2002/0080795 | A1 | 6/2002 | Van Wageningen et al. |
| 2002/0112228 | A1 | 8/2002 | Granston et al. |
| 2002/0120923 | A1 | 8/2002 | Granston et al. |
| 2003/0128712 | A1 | 7/2003 | Moriwaki et al. |
| 2004/0003206 | A1 | 1/2004 | May et al. |
| 2004/0015934 | A1 * | 1/2004 | Muthukumar et al. ....... 717/160 |
| 2004/0064682 | A1 | 4/2004 | Nguyen et al. |
| 2004/0117595 | A1 | 6/2004 | Norris et al. |
| 2005/0053012 | A1 | 3/2005 | Moyer |
| 2005/0055534 | A1 | 3/2005 | Moyer |
| 2005/0055543 | A1 | 3/2005 | Moyer |
| 2006/0101251 | A1 | 5/2006 | Nguyen et al. |
| 2006/0190706 | A1 | 8/2006 | Baxter et al. |

OTHER PUBLICATIONS

Talla et al., Bottlenecks in Multimedia Processing with SIMD Style Extensions and Architectural Enhancements, IEEE Transactions on Computers, vol. 52, Issue 8, Aug. 2003, pp. 1015-1031.

Wulf, Evaluation of the WM Architecture, Proceedings of the 19th Annual International Symposium on Computer Architecture, 1992, pp. 382-390.

Samadzadeh et al., A Heuristic Multiprocessor Scheduling Algorithm for Creating Near-Optimal Schedules Using Task System Graphs, Proceedings of the 1992 ACM/SIGAPP Symposium on Applied Computing, 1992, pp. 711-718SAM.

Prasanna et al., Generalized Multiprocessor Scheduling for Directed Acylic Graphs, Proceedings of the 1994 ACM/IEEE Conference on Supercomputing, 1994, pp. 237-246.

Aiken et al., Resource-Constrained Software Pipelining, IEEE Transactions on Parallel and Distributed Systems, vol. 6, No. 12, Dec. 1995, pp. 1248-1270.

Al-Mouhamed, Lower Bound on the No. of Processors and Time for Scheduling Precedence Graphs with Communication Costs, IEEE Transactions on Software Engineering, vol. 16, No. 12, Dec. 1990, pp. 1390-1401.

Cooper et al., Efficient Computation of Flow Insensitive Interprocedural Summary Information, Proceedings of the ACM SIGPLAN 1984 Symposium on Compiler Construction, SIGPLAN Notices, vol. 19, No. 6, Jun. 1984, pp. 247-258.

Talla, Architectural Techniques to Accelerate Multimedia Applications on General-Purpose Processors, Dissertation, University of Texas at Austin, Aug. 2001, pp. 94-125.

Kavi et al., A Formal Definition of Data Flow Graph Models, IEEE Transactions on Computers, vol. C-35, No. 11, Nov. 1986, pp. 940-948.

Kwok et al., Static Scheduling Algorithms for Allocating Directed Task Graphs to Multiprocessors, ACM Computing Surveys, vol. 31, No. 4, Dec. 1999, pp. 406-471.

Lam, Software Pipelining: An effective Scheduling Technique for VLIW Machines, Proceedings of the SIGPLAN 1988 Conference on Programming Language Design and Implementation, Jun. 22-24, 1988, pp. 318-328.

Lee et al., A Transformation-Based Method for Loop Folding, IEEE Transactions on Computer-Aided Design of Integrated Circuits and Systems, vol. 13, No. 4, Apr. 1994, pp. 439-450.

Strong, Vector Execution of Flow Graphs, Journal of the Association for Computing Machinery, vol. 30, No. 1, Jan. 1984, pp. 186-196.

* cited by examiner

METHOD AND APPARATUS FOR NESTED INSTRUCTION LOOPING USING IMPLICIT PREDICATES

CROSS-REFERENCE TO RELATED APPLICATION

This application is related to U.S. patent applications Ser. No. 10/652,135 filed on Aug. 29, 2003 and Ser. No. 10/993,971 filed on Nov. 19, 2004, which are incorporated herein in their entireties.

BACKGROUND

In data processing applications, there is a significant class of computations, described by nested loops. A nested loop includes an inner loop, which performs multiple iterations of a computation, and an outer loop that performs occasional control operations between sets of iterations. These control operations include, for example, addressing adjustments or the extraction of partial answers.

In particular, some nested loops take the form:
for (outer_count iterations)
　outer-pre
　for (inner_count iterations)
　　inner
　outer-post
where 'inner' denotes the group of instructions in the inner loop, 'outer-pre' denotes a group of instructions preceding the inner loop and 'outer-post' denotes a group of instructions performed after the inner loop. The 'outer-pre' and 'outer-post' groups are allowed to be empty.

The inner loop may be executed on a hardware accelerator such as a programmable, very long instruction word (VLIW) computer. Such computers use software pipelining to introduce parallelism into the computation of software loops. VLIW computers allow pipelined implementations of various loop constructs to operate with high throughput. An example of such a computer is the Reconfigurable Streaming Vector Processor (RSVP), which is a statically scheduled VLIW computer that executes dataflow graphs on vector data (data streams) in a highly pipelined fashion.

BRIEF DESCRIPTION OF THE FIGURES

The accompanying figures, in which like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
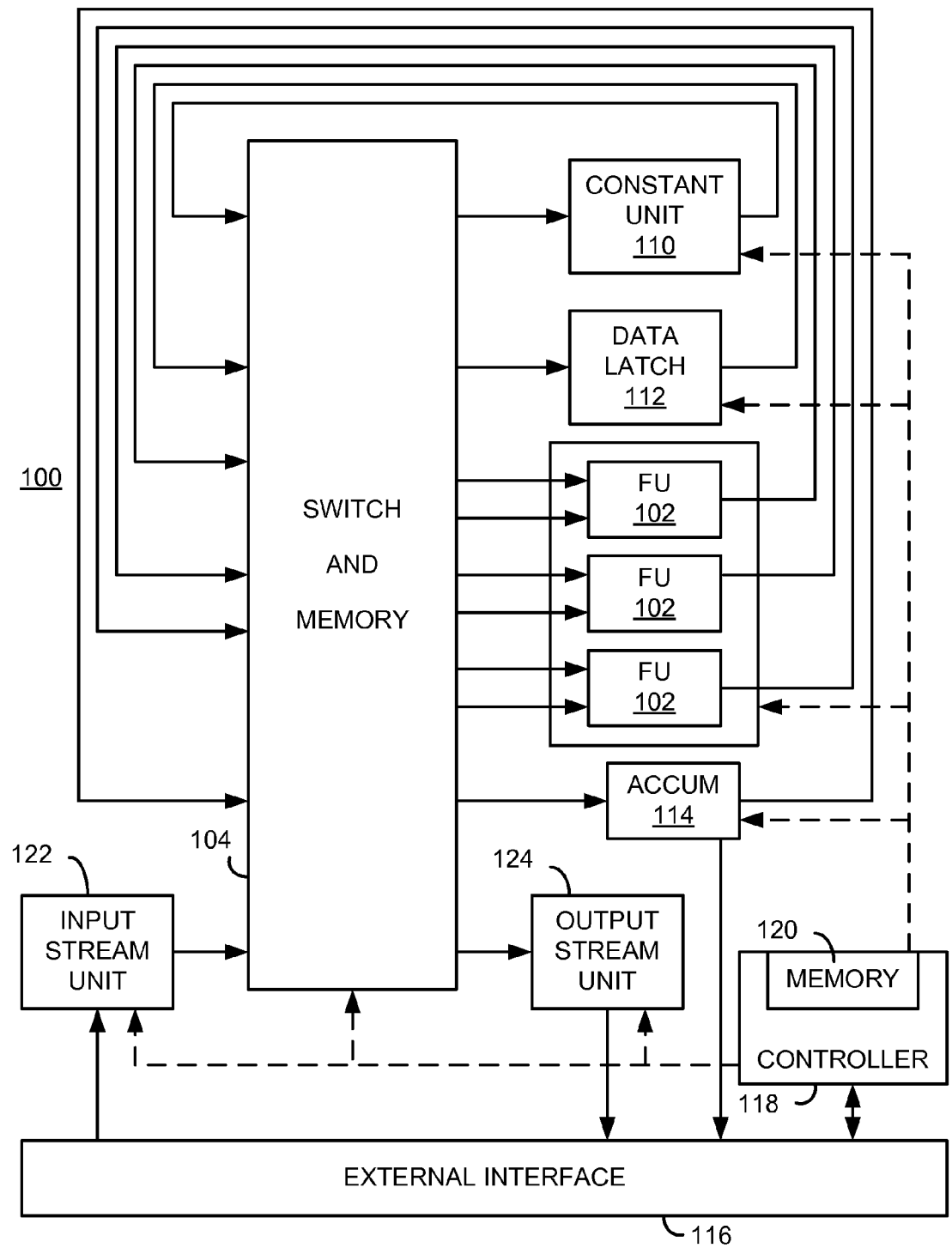
FIG. 1 is a block diagram of an exemplary vector processor in accordance with some embodiments of the invention.

Before describing in detail embodiments that are in accordance with the present invention, it should be observed that the embodiments reside primarily in combinations of method steps and apparatus components related to the programming and implementation of nested loops in data processors. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms 'comprises', 'comprising', or any other variation thereof, are intended to cover a non-exclusive inclusion, such that a process, method, article, or apparatus that comprises a list of elements need not include only those elements but may include other elements not expressly listed or inherent to such process, method, article, or apparatus. An element preceded by 'comprises . . . a' does not, without more constraints, preclude the existence of additional identical elements in the process, method, article, or apparatus that comprises the element.

It will be appreciated that embodiments of the invention described herein may comprise one or more conventional or vector processors and unique stored program instructions that control the one or more processors to process nested instruction loops. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

A nested loop has the following form:
for (outer_count iterations)
　outer-pre
　for (inner_count iterations)
　　inner
　outer-post
where 'outer-pre', 'inner' and 'outer-post' denote groups of instructions. 'outer-pre' and 'outer-post' may contain no instructions. The nested loop has three parts: outer-pre, inner, and outer-post, although any of these may be empty. In particular, for a traditional pipelined loop, both outer sections are empty.

The effective execution sequence is:
　outer-pre, inner[inner_count times], outer-post,
　outer-pre, inner[inner_count times], outer-post, etc.
In prior approaches, each time the inner loop is executed the pipeline is filled and drained to allow for execution of the outer-pre and outer-post instructions. This results in a loss of efficiency. For example, when a reconfigurable or fixed hardware accelerator is used, the inner loop may be executed by a function call to the hardware accelerator from a host computer. However, control is returned to the host computer once all iterations of the inner loop are completed.

An example of a nested loop is the computation of N points from a 32-tap finite impulse response (FIR) filter. The computation may be programmed, in the RSVP language for example, as:

```
for (i=0; i<N; i++)
    _vclra(0); _vclra(1);
    _vloop(&cfirdfg, 32);
    *r++=_vgetah(0,0);
    *r++=_vgeta(1,0);
```

In this example, the instructions _vclra(0) and _vclra(1) form the outer-pre group and are used to clear the accumulators. The instructions *r++=_vgetah(0,0) and *r++=_vgeta(1,0) form the outer-post and are used to extract the results of inner loop. Most of the code is executed on a host computer, but the instruction '_vloop(&cfirdfg, 32)' is an instruction to configure the hardware accelerator according to a data flow graph (DFG) description of the inner loop and to execute the loop 32 times. This instructs the accelerator to perform a multiply-accumulate operation. The DFG is denoted by 'cfirdfg', and its location in memory is denoted by '&cfirdgf'. The computation pipeline is filled and drained 32 times in this example.

For a vector processor with two parallel paths, the data flow graph may be expressed as, for example:

```
vld (v1); vld (v1);
vld (v2); vld (v2);
vmul; vmul;
vadda; vadda;
``` where 'vld' denotes a vector load operation, 'vmul' denotes a multiply operation and 'vadda' denotes an accumulation operation.

If the outer loop instructions are only for addressing adjustments (as in the processing of 2-dimensional data), the adjustments may be made by implementing a second set of 'span and skip' registers. The span and skip register values may be used to define how memory addresses are to be changed before or after each execution of the inner loop. This enables the nested loop to be implemented as a single loop and increases efficiency.

However, this approach does not enable the extraction of partial answers, as exemplified by the vgetah(0,0) and vgeta(1,0) instructions in the FIR example listed above.

In a statically scheduled VLIW computer, such as the RSVP, memory requirements for storing prolog instructions (used for filling the pipeline) and epilog instructions (used for draining the pipeline) may be eliminated by the use of two independent mechanisms. Firstly, prolog instructions are eliminated by tagging a data element with a 'validity tag', or 'valid-bit', which indicates if the associated data element is valid or invalid. Secondly, sink-specific iteration counters may be used for epilog instruction elimination. For example, data values may not be sunk (saved) if an iteration counter has expired.

In accordance with one embodiment of the invention, a nested loop is mapped onto a fixed VLIW word schedule, suitable for execution on a pipelined processor. One advantage of this approach is that is enables a complete nested loop to be performed on a hardware accelerator without the need for filling and draining the pipeline each time the inner loop is executed.

Instruction predication is provided through the use of data validity bits, which guard against invalid data as the pipeline is filled and drained. (A predicate is a boolean-valued characteristic function or indicator function of a relation. A data validity tag is an example of a predicate). Further, each source or sink contains its own copy of the loop counters, appropriately initialized at graph execution start time. Each source or sink can be used in only one of the sections.

The combination of data validity bits and loop counters allow the generation of a set of VLIW words that includes all of the operations in the three parts of a loop and ensures that the operations will be performed at only the correct times.

The following example illustrates the general concept. Consider the nested loop:

```
for i=0:N-1 {
    load a;
    load b;
    c=fn(a,b);
    acc=0;
    for j=0:M-1 {
        load d;
        e=fn(c, d);
        store e;
        acc=acc+e;
    }
    store acc;
}
``` where 'fn(.)' denotes a functional operation and 'acc' denotes an accumulator. A validity tag is associated with each data value, so that a data structure has a value and a tag. The value of x is written as 'x.value' and the validity tag is written as 'x.valid'. The nested loop can then be written as the following single loop.

```
a.valid = 0; b.valid = 0; c.valid = 0;   // initialize validity tags
                                          to invalid
d.valid = 0; e.valid = 0;                 // initialize validity tags
                                          to invalid
acc = 0;                                  // initialize accumulator
i = 0; j = 0;                             // initialize inner and outer
                                          counters
for k = 0:N*M −1
    if ( j == 0) {load a.value; a.valid =1; } else {a.valid = 0;}    // outer
                                                                      pre load
    if (j == 0) {load b.value; b.valid =1; } else {b.valid = 0;}     // outer
                                                                      pre load
    if (a.valid && b.valid ) {                                        // outer
                                                                      loop
                                                                      operation
        c.value = fn(a.value, b.value); c.valid = 1;
    }else{
        c.valid = 0;
    }
    if(c.valid)                                                       // latch value for
                                                                      inner loop
        {cl.value = c.value; cl.valid = c.valid;}
    load d.value; d.valid = 1;                                        // inner
                                                                      load
    if (cl.valid && d.valid ) {                                       // inner
                                                                      operation
        e.value = fn(cl.value, d.value); e.valid = 1;
    }else{
        e.valid = 0;
    }
    if (e.valid) { store e.value; }                                   // inner store
    if (e.valid) { acc = acc + e.value; }                             // inner operation
    if (j == M-1) { store acc;}                                       // outer post store
    j = j+1 modulo M;                                                 // increment inner
                                                                      counter
    if (j == M-1) { i = i+1 }                                         // increment outer
                                                                      counter
}
```

Instructions in the single loop are predicated by checks on the validity of data, by checks on loop counters or by a combination thereof. In accordance with one embodiment of the invention, these checks are performed in processor hardware.

The desired behavior of load and store operations depends upon whether the operation is in an outer-pre, outer-post of an inner portion of a nested loop.

In the outer-pre portion of the code, a load instruction has the form: 'if (j==0 ){load a.value; a.valid=1;} else {a.valid=0;}'. Thus, a load is only performed if the inner loop counter is zero. In one embodiment of the invention, an input stream unit of a vector processor includes an inner loop counter and an associated logic circuit so that a data value is only loaded once per outer loop. At other iterations, the data is tagged as invalid.

In the inner portion of the code, a load instruction has the form 'load d.value; a.valid=1;'. Thus, a load is performed every iteration.

In the outer-post portion of the code, a store instruction has the form: 'if (j==M-1) {store acc;}'. Thus, a store is performed only once per outer iteration, at the end of the inner loop. In one embodiment of the invention, an output stream unit of a vector processor includes an inner loop counter and an associated logic circuit so that a data value is only sunk once per outer loop. In general, the data value is not sunk if the data is invalid.

In the inner portion of the code, a store instruction has the form: 'if (e.valid) {store e.value;}'. Thus the data is sunk only if it is valid.

An functional operation takes the form:
if (a.valid && b.valid) {
    c.value=fn(a.value, b.value); c.valid=1;
} else {
    c.valid=0;
}

Thus, functional units of the vector processor operate on data values in the data path ('a.value' and 'b.value' in this example). A functional unit produces a valid result (c) if the data validity tags associated with inputs data values are set to 'valid'.

The instruction:
    if(c.valid) {cl.value=c.value; cl.valid=c.valid;}
saves the data structure c in a data latch cl for use in the inner loop. This is used in this embodiment because c is only valid on the first iteration of the inner loop. In an alternative embodiment, the data latch includes an inner counter, so that the latch instruction is:
    if(c.valid)
        {cl.value=c.value; cl.valid=c.valid; count=N1;}
    else
        {if (count>0) {count=count-1;} else {cl.valid=0;}}

In this embodiment, the latch data value only remains valid for N iterations of the inner loop.

The instructions described above are conditional instructions that are predicated on iteration counts and data validity. In accordance with one embodiment of the invention, the predicates are performed by hardware elements. For example, the vector processor may include counters and other logic circuits that enable nested loops to be executed on the vector processor as a single loop.

In such a vector processor, the example FIR filter program discussed above may be implemented by executing a single data flow graph, with the function call _vloop2(&firdfg2,32, N). The data flow graph may take the form:

vconst = 0;
vputa; vputa;       // puts the value 0 in accumulators
vinner;             // indicates start of the inner portion of the loop
vld (v1); vld (v1); // inner loop loads

| | |
|---|---|
| vld (v2); vld (v2); | // inner loop loads |
| vmul; vmul; | // inner multiply operations |
| vadda; vadda; | // inner accumulate operations |
| vpost; | // indicates start of outer-post portion of the loop |
| vgeta; vgeta; | // retrieve partial sums |
| vst; vst; | // store partial sums |

The 'vinner' and 'vpost' instructions mark the separation between the outer-pre, inner, and outer-post sections and may be used to set counter values. Without these instructions, the entire loop is treated as an 'inner' loop.

An exemplary embodiment of streaming vector processor hardware 100 is shown in FIG. 1. The vector processor may serve as a hardware accelerator for a host computer. Referring to FIG. 1, the outputs and inputs of a number of functional units 102 are interconnected via a re-configurable interconnect switch 104. The interconnect switch 104 couples between the functional units 102, an input stream unit 122 and an output stream unit 124 to form the data path. The functional units may include a multiplier, an adder, a logic unit and a shifter. Other functional units may be included, and multiple functional units of a particular type may be included. The outputs from the functional units may be single registers or pipeline registers. The registers allow for storage of data tokens and the associated data validity tags. The functional units may support bit-slice operations. For example, the multiplier may have a 128-bit input and a 128-bit output and be able to perform two 32×32 to 64-bit or four 16×16 to 32-bit multiplies. In this case, a data validity tag is associated with each data value. The hardware also includes one or more accumulators 114. The accumulators act as both accumulators and storage registers and are interfaced both to the interconnection switch 104 and to an external interface 116. The accumulators operate as data sinks and as functional elements. The external interface 116 enables the vector processor to link with a host processor and allows the host processor to access the accumulators and other parts of the vector processor. The functional units 102 and the re-configurable interconnection switch 104 define the data-path for the vector processor. The functional units and the re-configurable interconnection switch 104 are linked to a controller 118 that includes a memory 120, preferably a cache, for storing a program of instructions describing the implementation specific description of a data-flow graph of the desired vector computation. At each cycle of the processor clock, the controller produces control words that configure the links in the interconnection switch and drive the functional units. Storage and presentation of scalar values and tunnel node functionality is provided by constant unit 110. The scalar values and tunnel initialization values may be loaded by the host processor or by the program of instructions. Additionally, a data latch 112 provides a means for storing and presenting data values. The data latch 112 is described in more detail below.

In operation, input data values are provided to the interconnection switch 104 by one or more input stream units 122 (only one unit is shown in the figure). Each input-stream unit 122 is controlled by a set of parameters describing the allocation of data in an external memory. This set of parameters is provided by the host processor, to which the input-stream unit is connected via external interface 116. The output stream unit 124 is similarly controlled by the host processor and is operable to transfer data from the re-configurable interconnection switch 104 to external memory. The input-stream unit 122 and the output-stream unit 124 are linked to the controller 118 that synchronizes data flow.

The following examples assume an inner count of 4 and an outer iteration count of 3. Source nodes in the 'outer-pre' portion of the loop are constrained to fire (i.e., produce valid outputs) once per outer iteration. This firing corresponds with the first iteration of the inner loop. In one implementation, these sources fire when their inner loop count is at the full value and then produce a stream of invalid outputs when the inner loop count is less than the full value. With an inner loop count of 4, the sources will produce 'fire, invalid, invalid, invalid', where fire denotes that a valid data value is produced.

Source nodes in the 'outer-post' portion of the loop also fire once per outer iteration, but the firing is synchronized with the final inner iteration. They will produce 'invalid, invalid, invalid, fire' for the example loop.

Source nodes in the inner loop fire at all times until the loop counts are exhausted. They will produce 'fire, fire, fire, fire' for the example loop.

Figure 2:
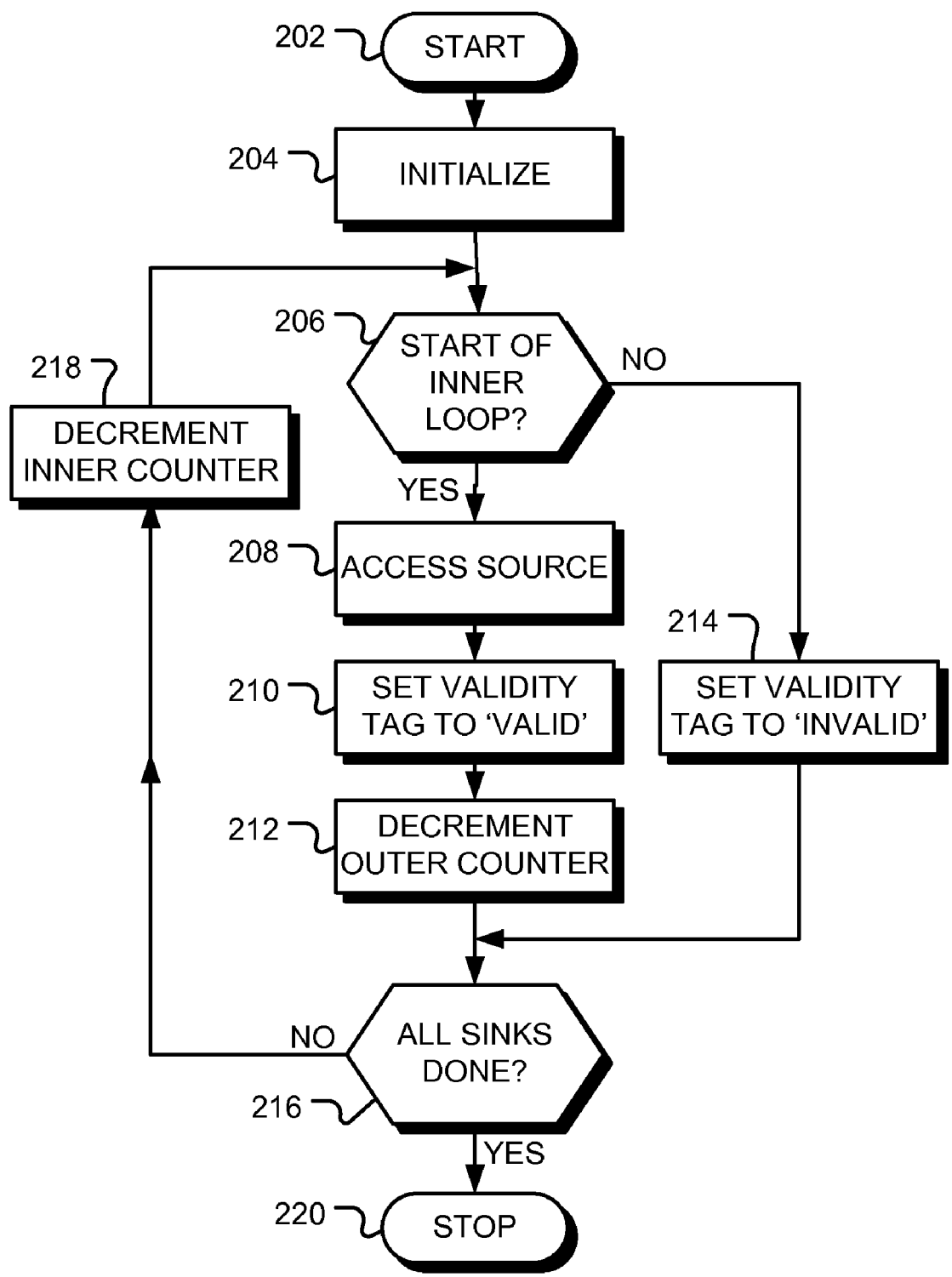
FIG. 2 is a flow chart showing a method of operation of an input stream unit operating as a source node in the outer-pre portion of a loop in accordance with certain embodiments of the invention.

FIG. 2 is a flow chart showing a method of operation, in accordance with certain embodiments of the invention, of an input stream unit that operates as a source node in the outer-pre portion of a loop. The input stream unit provides a data value to a data path and sets an associated data validity tag to 'valid' once per outer loop iteration, as indicated by an inner counter of the input stream unit. If the inner counter does not indicate the start of an inner loop, the associated data validity tag is set to 'invalid'. Following start block 202, the input stream unit is initialized at block 204. In particular, inner and outer loop counters are initialized together with various constant values dependent upon parameters such as the number of inner iterations, the number of outer iterations, and the skip, span and count values that specify the organization of the data in memory. At each execution step, the inner loop counter is checked at decision block 206 to determine if this step is start of an inner loop. If so, as depicted by the positive branch from decision block 206, the source node accesses a data source (i.e., the source node 'fires') and retrieves a data value at block 208. At block 210, the data validity tag associated with the data value is set to 'valid'. At block 212, the outer counter is decremented. If the current execution step is not the start of an inner loop, as depicted by the negative branch from decision block 206, the data validity tag is set to 'invalid' at block 214, and the source node does not fire. At decision block 216, the outer counter is checked to determine if the entire nested loop has been completed. If the loop is not complete, as indicated by the negative branch from decision block 216, the inner counter is decremented at block 218 and flow returns to decision block 206. Otherwise, if all outer iterations have been completed, the loop terminates at block 220.

The total number of steps is dependent on the number of iterations in the inner and outer loops and may also be dependent on the number of steps required for filling and draining the computation pipeline.

A source node in the outer-post portion of a nested loop operates in a similar manner, except that data is accessed at the end of an inner loop rather than at the start.

Figure 3:
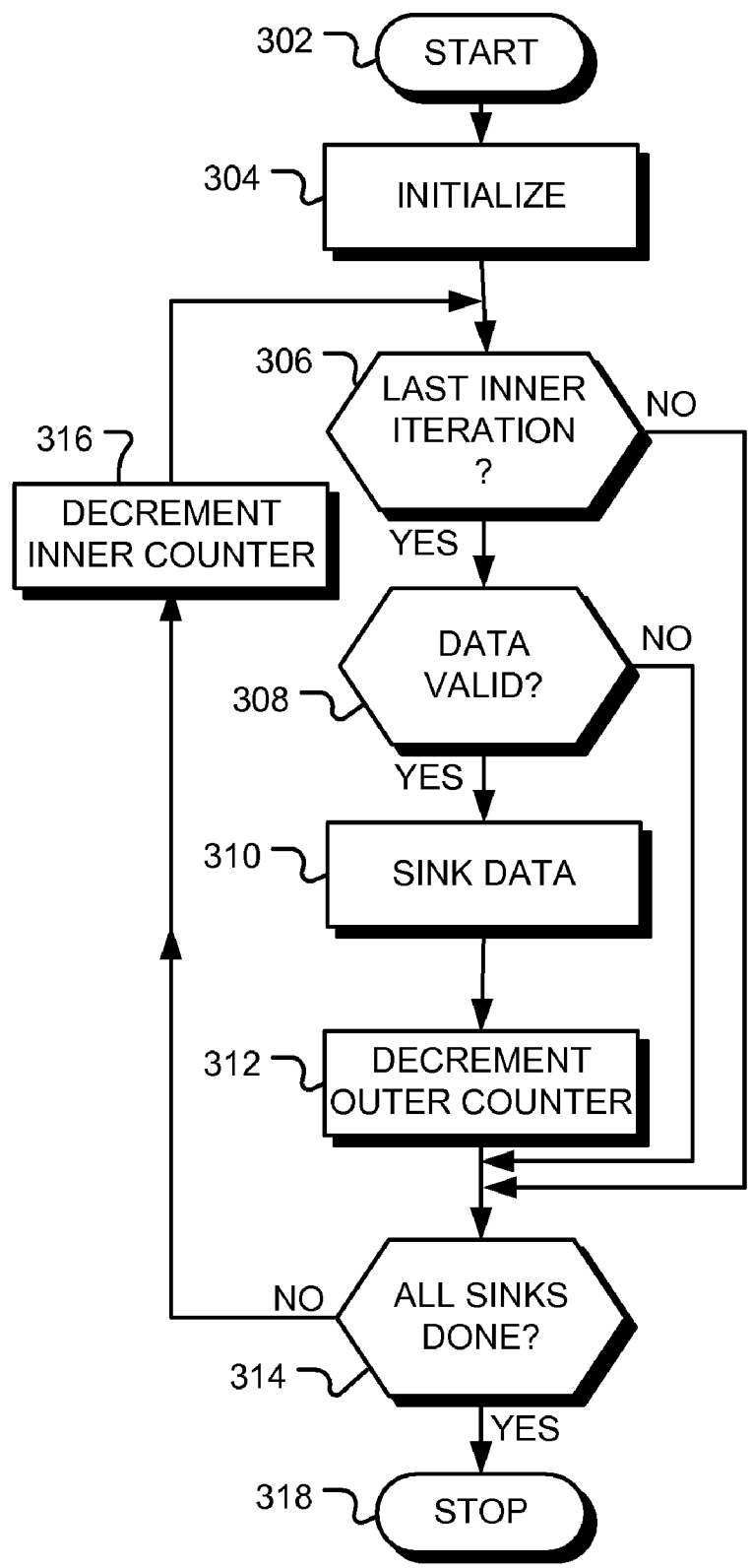
FIG. 3 is a flow chart showing a method of operation of an output stream unit operating as a sink node in the outer-post portion of a loop in accordance with certain embodiments of the invention.

FIG. 3 is a flow chart showing a method of operation, in accordance with certain embodiments of the invention, of an output stream unit operating as a sink node in the outer-post portion of a loop. The output stream unit of the vector processor sinks a data value from the data path once per outer loop iteration, as indicated by an inner counter of the output stream unit, if an associated data validity tag indicates that the data value is valid. Following start block 302, the sink node is initialized at block 304. In particular, inner and outer loop counters are initialized together with various constant values dependent upon parameters such as the number of inner iterations, the number of outer iteration, and the skip, span and count values that specify how output data is to be organized in memory. At each execution step, the inner loop counter is checked at decision block 306 to determine if an inner loop has been completed. If so, as depicted by the positive branch from decision block 306, a check is made at decision block 308 to determine if the data is valid. This may be done by checking the data validity tag. If the data is valid, as depicted by the positive branch from decision block 308, the data value is sunk (i.e., the sink node 'fires') at block 310. The outer counter is then decremented at block 312 and flow continues to decision block 314. If the inner loop counter indicates that the inner is not completed, as depicted by the negative branch from decision block 306, the sink node does not 'fire'. At decision block 314, the outer counter is checked to determine if the entire nested loop has been completed. If the entire nested loop is not complete, as indicated by the negative branch from decision block 314, the inner counter is decremented at block 316 and flow returns to decision block 306. Otherwise, if all outer iterations have been completed, the loop terminates at block 318.

Intermediate nodes are unaffected by the nesting; they continue to follow their semantics of producing valid results when all of their required inputs for that operation are valid. That is, the output of an intermediate node is tagged as 'invalid' unless all of the required input values are tagged as 'valid'. That is, the output is only valid if all required inputs are valid.

Sink nodes will only fire when their input operands are valid.

Sinks in either the outer-pre or the outer-post portion of the loop will only fire one time per outer iteration. These sinks should also only ever receive a single valid operand one time per outer iteration. Sinks associated with the outer loops are constrained so that they behave as if their inner count is '1', instead of whatever the actual inner loop count may be.

The approach described above allows many 2-level nested loops to be expressed in a VLIW language and mapped to fixed- or reconfigurable-hardware implementations. The approach increases the total number of iterations performed by a hardware accelerator before control is returned to the host processor. In turn, this yields improved throughput by reducing the number of pipeline filling and draining operations required.

Some prior processors have used predicated instructions, where an instruction is executed or not dependent upon the calculation of a condition code. However, the approach described above is driven by iteration counts rather than condition calculations and, consequently, is more efficient and may be implemented using simpler hardware.

Figure 4:
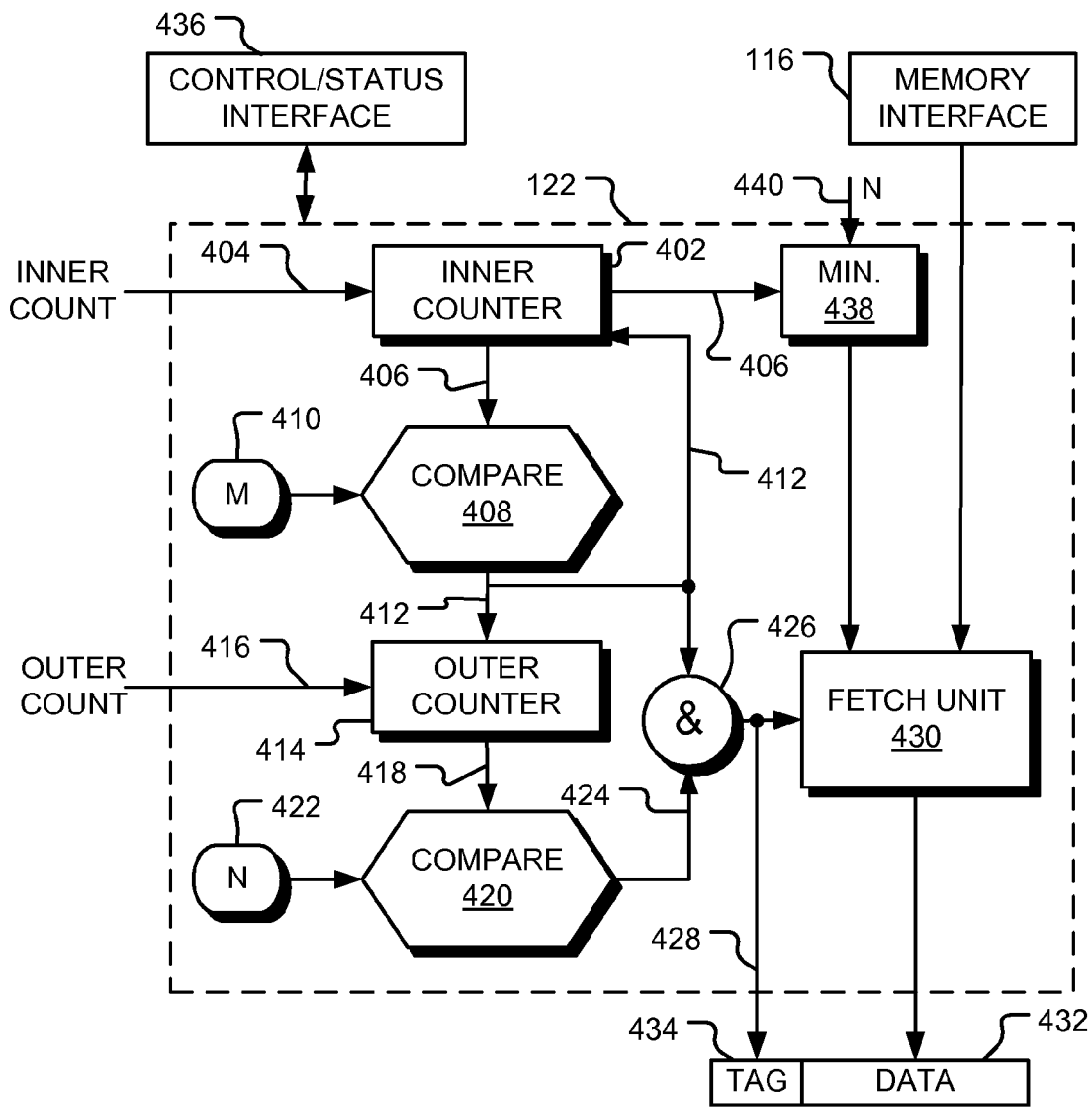
FIG. 4 is a block diagram of an input stream unit consistent with certain embodiments of the invention.

FIG. 4 is a block diagram of an input stream unit (source module) consistent with certain embodiments of the invention. The input stream unit performs load instructions of the type 'if(j==0) {load a.value; a.valid=1;} else {a.valid=0;}'.

The input stream unit includes a fetch unit 430, a logic circuit (elements 408, 420 and 426, for example) and a first inner counter 402. Once per outer loop iteration of the nested program loop, as indicated by the first inner counter 402, the input stream unit fetches a data value and outputs, to a data path, the data value 432 and a data validity tag 434 associated with the data value, the data validity tag indicating that the data value is valid. At other iterations of the inner loop, the data validity tag 434 is set to indicate that the data value is invalid.

The inner counter 402 is used for counting iterations (i) of the inner loop of a nested loop. At the start of operation, the inner counter 402 receives an initialization value 404, which may be dependent upon the number of iterations, M, in the inner loop. The inner counter 402 provides an inner count value 406 as output. The inner count value 406 is compared in compare unit 408 with a constant value 410. The inner counter 402 may count completed iterations of the inner loop, in which case the counter is incremented and compared to zero if the load operation is in the outer-pre portion or M if the load operation is in the outer-post portion. Alternatively, the inner counter may count iterations remaining, in which case the counter is decremented and compared to M if the load operation is in the outer-pre portion or to zero if the load operation is in the outer-post portion. The output 412 from the compare unit is asserted when the constant value 410 and the inner counter value 406 are equal. In the case where the inner counter shows the number of iterations remaining, the inner counter is decremented in each iteration of the inner loop. In the alternate case, where the inner counter shows the number of iterations completed, the counter is incremented in each iteration of the inner loop.

The input stream unit 122 also includes an outer counter 414 for counting iterations of the outer loop of a nested loop. At the start of operation, the outer counter 414 receives an initialization value 416. The outer counter 414 provides an outer count value 418 as output. The outer count value 418 is compared in a second compare unit 420 with a constant value 422, which is dependent upon the number of iterations, N, in the outer loop. The output 424 from the compare unit is asserted when the outer counter value 418 is less than constant value 422. The outer counter is decremented in each iteration of the outer loop. This may be indicated by the signal 412 from the first compare unit 408. In addition, the inner counter 402 may be reset when the signal 412 is asserted.

When the comparison signals 412 and 424 are both asserted, the output 428 from AND logic unit 426 as asserted and the fetch unit 430 fires. The fetch unit 430 retrieves a data value via the external interface 116 and provides a data 432 as output. In addition, the output 428 is used to update the data validity tag 434 associated with the data value 432 to indicate that the data is valid. When the signal 428 is not asserted, the fetch unit 430 does not fire and the data 432 is tagged as being invalid.

Operation of the input stream unit 122 is controlled via control and status interface 436.

When N parallel data paths are used, the input stream unit may further include a minimum unit 438 that compares the inner count 406 (which indicates the number of iterations remaining) to the number of data path as provided by signal 440. This allows loops to be unrolled onto N parallel data paths even when the number of inner iterations is not an integer multiple of N.

Figure 5:
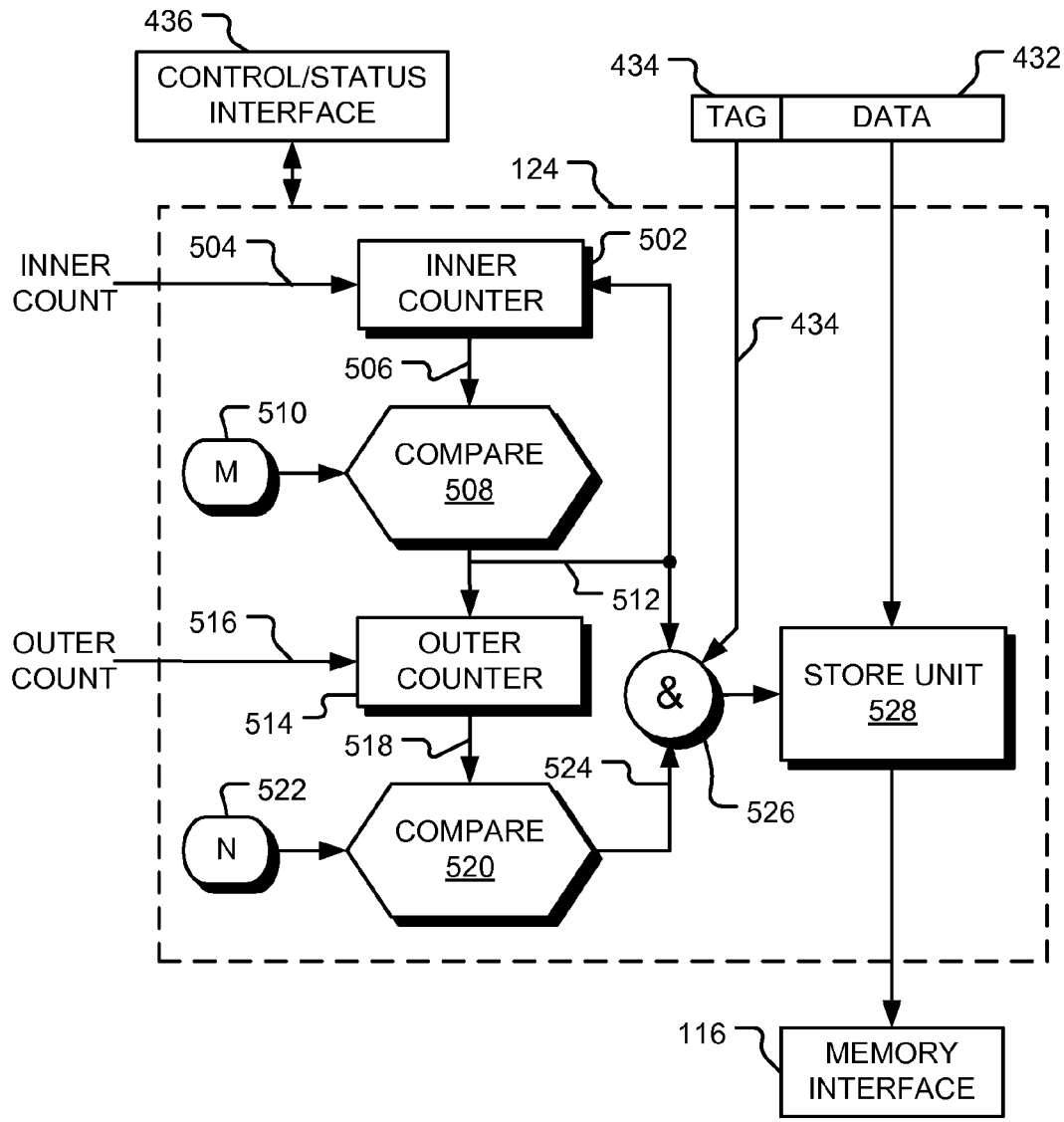
FIG. 5 is a block diagram of an output stream unit consistent with certain embodiments of the invention.

FIG. 5 is a block diagram of an output stream unit (sink module) consistent with certain embodiments of the invention. The output stream unit performs instructions of the form: 'if(j==M-1 && x.valid==1) {store x.value;}'. The output stream unit 124 comprises a store unit 528, a logic circuit (elements 526, 508 and 520, for example) and an inner counter 502. The output stream unit receives a data value 432 and an associated data validity tag 434 from a data path. Once per outer loop iteration of the nested program loop, as indicated by the second inner counter, the output stream unit sinks a data value if it is valid, as indicated by the associated data validity tag. At other inner loop iterations, or if the data validity tag indicates that the data value is invalid, the output stream unit does not sink the data value.

The inner counter 502 is used for counting iterations of the inner loop of a nested loop. At the start of operation, the inner counter 502 receives an initialization value 504. During operation the inner counter 502 provides an inner count value 506 as output. The inner count value 506 is compared in compare unit 508 with a constant value 510. The values are equal once per outer iteration. The value of the constant depends on whether the output stream unit is operated in the outer-pre or outer-post portion of a nested loop. The output 512 from the compare unit is asserted when the constant value 510 and the inner counter value 506 are equal. The inner counter 502 is modified at each iteration of the inner loop. The output stream unit 124 also includes an outer counter 514 for counting iterations of the outer loop of a nested loop. At the start of operation, the outer counter 514 receives an initialization value 516. During operation the output counter 514 provides an outer count value 518 as output. The outer count value 518 is compared in a second compare unit 520 with a constant value 522. The counter may count the number of iterations remaining, in which case the counter is initialized to the total number of iterations and is decremented until it reaches zero. In addition, the inner counter 502 may be reset when the signal 512 is asserted. When the outer count value is indicative of the number of outer iterations remaining, the output 524 from the compare unit is asserted if the outer counter value 518 is zero or less. In this case, the outer counter is decremented at each iteration of the outer loop.

The output stream unit receives a data value 432 and an associated validity tag 434 as inputs. The output from an AND logic unit 526 is asserted when the comparison signals 512 and 524 are both asserted and the validity tag 434 is valid. When the output from the AND logic circuit 526 is asserted, the store unit 528 fires. The store unit 528 receives a data value 432 and provides it to a memory interface 116. No data is sunk unless the output from AND logic unit 526 is asserted. Thus, data is sunk at most once per outer iteration, and only when the data is valid.

Operation of the output stream unit 124 is controlled via control and status interface 436.

A second part of the nested loop construct relates to the ability to handle 'loop unrolling' in nested loops. In practice, loop unrolling is an important technique for improving throughput where multiple instances of a loop are run at the same time. Unrolled loops traditionally need extra code to deal with any residual work where the number of iterations is not an integral multiple of the unrolling factor.

This limitation is removed by certain aspects of the present invention. In particular, some embodiments of the invention provide an ability to start two inner iterations at the same time in a nested loop, even when the total number of inner iterations is an odd number. More generally, some embodiments of the invention provide the ability to start several inner iterations even if the number of inner iterations is not known to be a multiple of the unrolling factor.

In the final (partial) inner iteration of an inner loop with an odd number of iterations, some of the inner sources would 'roll over' into the following outer iteration. This is undesirable since any consolidation of partial results (such as the summing of partial answers for a FIR) will produce incorrect results. The 'last inner' of one outer-iteration cannot be started at the same time as the 'first inner' of the next outer-iteration.

This potential problem may be avoided by 'padding' source operations and 'trimming' sink operations. A loop unrolled to start N iterations at the same time will have the N operations from the same source scheduled in the same VLIW word. The source unit will compare its inner count value with the N operations requested and only fire enough to fulfill the smaller value; the remaining source operations will produce invalid outputs. The operation of sinks is controlled by the invalid bits that flow through the computation once a source stops firing. These invalid outputs propagate through the rest of the VLIW schedule, preventing any inappropriate values being generated or stored.

Figure 6:
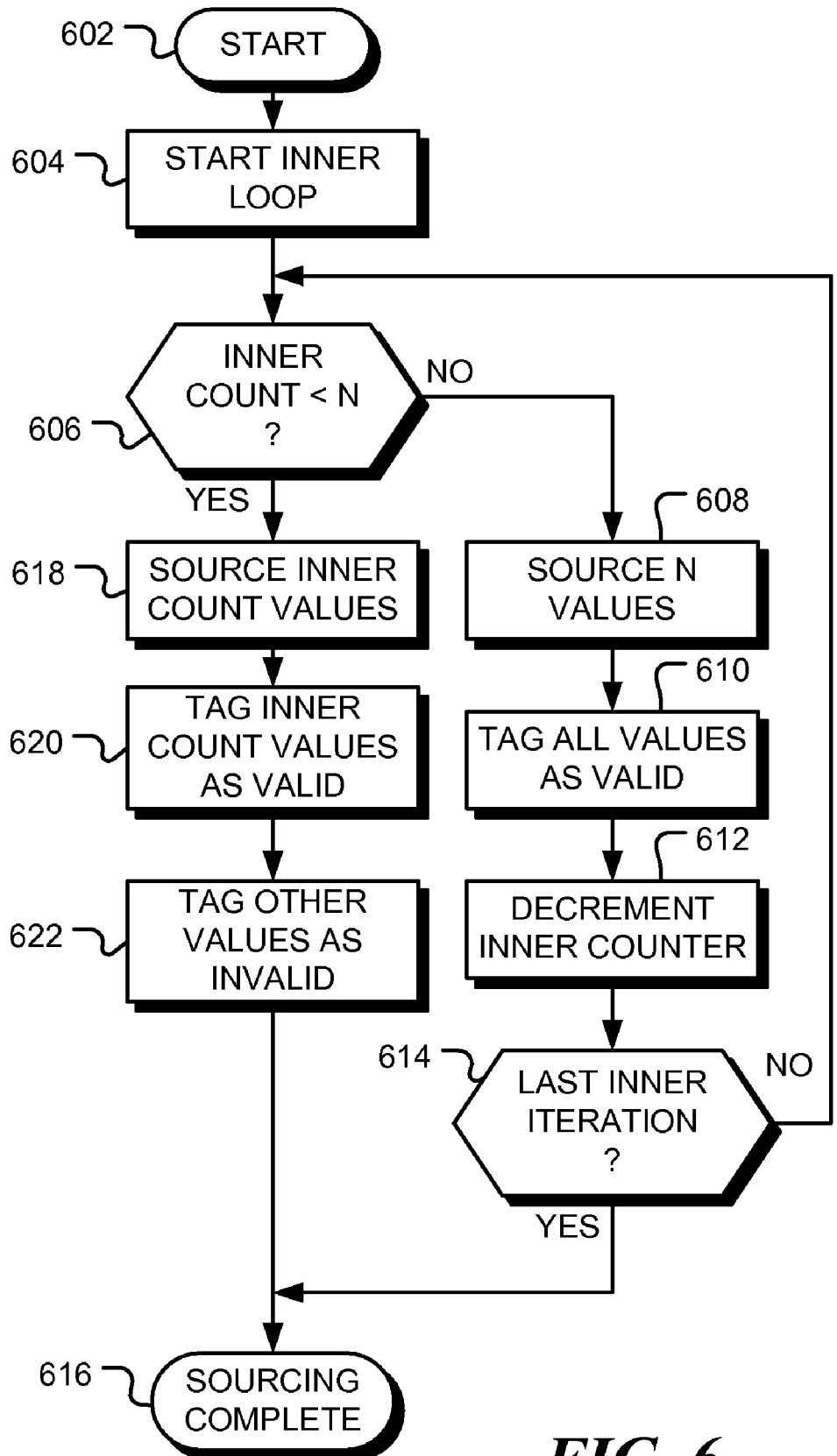
FIG. 6 is a flow chart of a method for unrolling nested loops in a parallel processor in accordance with certain embodiments of the invention.

FIG. 6 is a flow chart of a method for unrolling nested loops in a parallel processor in accordance with certain embodiments of the invention. It is assumed that a nested loop has been scheduled to use N parallel data paths. Operation may be controlled by a VLIW, for example. Following start block 602 in FIG. 6, an inner loop is started at block 604. The inner loop counters of the source nodes are initialized to the number of inner loop iterations remaining. At decision block 606, the inner loop counter is checked to determine if the number of inner loop iterations is less than N (the number of parallel data paths). If not, as depicted by the negative branch from decision block 606, N source values are read at block 608. These values are all tagged as valid at block 610. At block 612, the inner loop counter is decremented, and at decision block 614, a check is made to determine if this is the last inner iteration. If so, as depicted by the positive branch from decision block 614, the sourcing for this inner loop is complete as indicated by block 616. If this is not the last inner iteration (i.e., the inner loop counter is greater than zero), flow returns to block 606.

If the inner count is less than the number of parallel source operations N, as depicted by the positive branch from decision block 606, only enough source values are retrieved at block 618 to match the number of remaining inner iterations. The retrieved source values are tagged as valid at block 620, and, at block 622, the other values are tagged as invalid. For example, if there are two parallel data paths but only one remaining inner iteration only one source value is retrieved is retrieved and tagged as valid. The other source value is tagged as invalid. Outputs calculated using the invalid data will also be tagged as invalid and will not be sunk.

The combination of iteration counters and loop unrolling provides for significant performance improvement. For example, execution of a 32-tap FIR filter using a single nested loop runs four to eight times faster than multiple single loops and provides a performance improvement of between four and eight times. The actual improvement depends on the memory system performance. For example, in some hardware configurations the longer effective loop counts allow a greater reuse of the memory cache, which reduces the amount of memory traffic required. The number of times memory and instruction pipelines are filled and drained is reduced.

In some nested loops, a value is read once per outer loop by an input stream unit (source node) described above. On other inner loop iterations, the source node does not fire, and the output from the source unit is tagged as invalid. As a result, functional operations in the outer loop that use the data only produce valid outputs once per outer loop, as desired. However, if the data that is read once per loop is to be used in an inner loop, it must be made available as valid data. In accordance with certain embodiments of the invention, a data latch is used. In the example above, the instruction 'if(c.valid) {cl.value=c.value; cl.tag=c.valid}' is performed in the hardware by a data latch (or 'hole'). In an alternate embodiment, the instruction:

if(c.valid && j<M ) {cl.value=c.value; cl.tag=c.valid} else {c.valid=0}.

is used to reset the latched value once M iteration have been completed.

Figure 7:
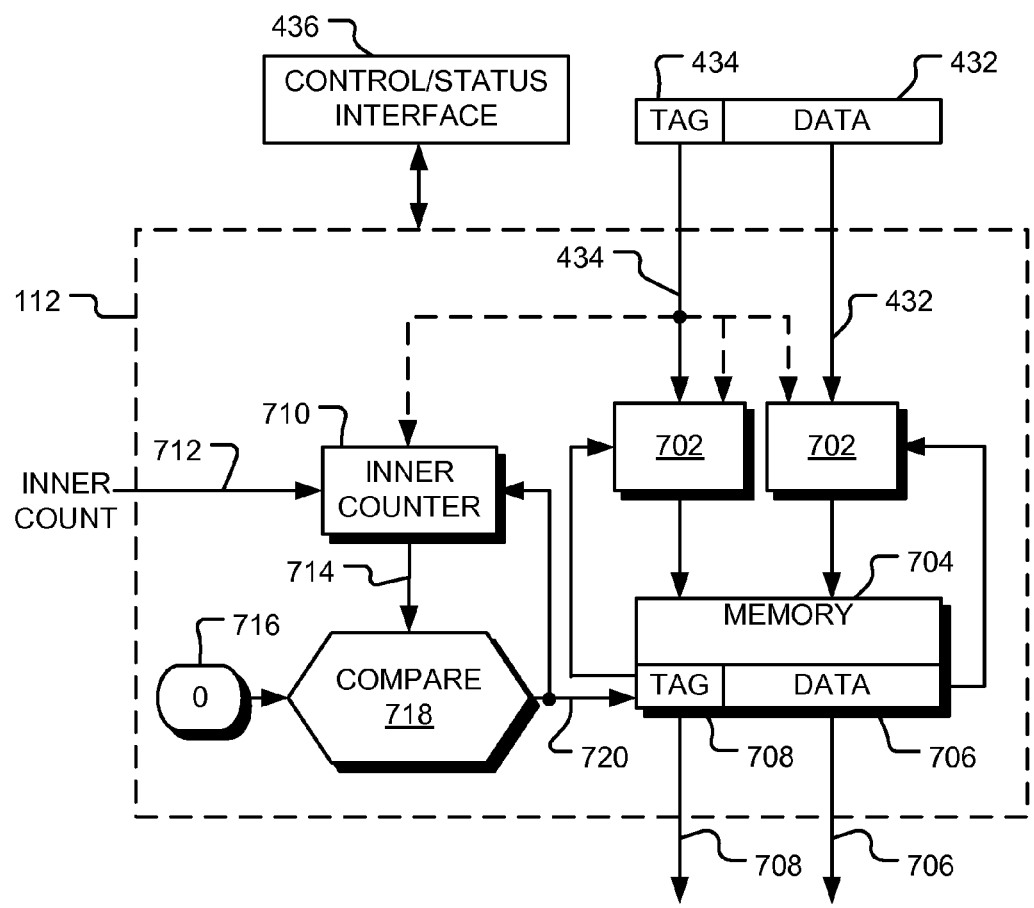
FIG. 7 is a simplified diagram of a data latch in accordance with some embodiments of the invention.

FIG. 7 is a simplified diagram of a data latch that enables a data value to pass from the outer loop of a nested loop to the inner loop. The data latch is also referred to as a 'hole'. Referring to FIG. 7, the data latch 112 receives a data value 432 and an associated validity tag 434 as input. The data latch 112 includes two switches or selectors 702 and a memory 704. The memory stores a data value 706 and its associated validity tag 708. In operation, the switches 702 are controlled by the incoming validity tag 434. If the tag indicates that the data is valid, the incoming data value 432 and associated tag 434 are stored in the memory 704. If the tag 434 indicates that the data value is invalid, the switches select the previously stored data value 706 and the associated data tag 708. The tag 708 is initialized to 'invalid' at the start of a nested loop to allow for filling of the data pipeline. The stored data value 706 and associated validity tag 708 are output from data latch.

Optionally, the data latch 112 may include an inner counter 710. The inner counter is initialized with an initial count value 712. The counter value 714 is compared to a value 716 in compare unit 718. If the counter expires, indicating that the inner loop is completed, the signal 720 is asserted. This causes the inner counter 710 to be reset and sets the tag value 708 to invalid. The inclusion of an inner counter allows invalid data values to 'pass through' the latch, which may be required for draining a computation pipeline.

The data latch 112 may be inserted in a data path between a node in the outer portion of a nested loop and a node in the inner portion of the nested loop. The data latch (hole) allows a data value from the outer portion of a nested loop to be used repeatedly in the inner iteration.

In the above description, it has been assumed that the counters count down to zero from an initial set value. However, it will apparent to those of ordinary skill in the art that the counters may count up or down from a initial set value to a specified end value.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

What is claimed is:

1. A vector processor for executing a nested program loop having an inner loop and an outer loop, the vector processor comprising:
   a first input stream unit comprising a fetch unit, a logic circuit and a first inner counter, the first input stream unit being configured to fetch a data value once per outer loop iteration of the nested program loop, as indicated by the first inner counter and being further configured to output, to a data path, the data value and a data validity tag associated with the data value, the data validity tag indicating that the data value is valid, and the first input stream unit being configured to set the data validity tag associated with the data value to indicate that the data value is invalid at other iterations of the inner loop;
   a plurality of functional units, each functional unit being configured to operate on input data values in the data path and produce, as output, a data value and an associated data validity tag, wherein the data validity tag is set to indicate that the output data value is valid if all of the inputs are valid; and a first output stream unit configured to receive a data value and an associated data validity tag from the data path, the first output stream unit comprising a store unit, a logic circuit and a second inner counter, wherein, once per outer loop iteration of the nested program loop, as indicated by the second inner counter, the first output stream unit sinks a data value if it is valid, as indicated by the associated data validity tag, and wherein, at other inner loop iterations, or if the data validity tag indicates that the data value is invalid, the first output stream unit does not sink the data value;

wherein the data path comprises an interconnect switch configured to couple between the plurality of functional units, the first input stream unit and the first output stream unit.

2. A vector processor in accordance with claim 1, further comprising a data latch configured to store a data value in a memory and to output the stored data value to the data path, wherein the stored data value is replaced by an input data value only if the input data value is valid.

3. A vector processor in accordance with claim 2, wherein the data latch further comprises a counter that is set when a data value is stored in the memory and is updated when a data value is output and wherein the data latch is configured to output a data validity tag to indicate that the output data value is invalid if the counter has expired.

4. A vector processor in accordance with claim 2, wherein the data latch is configured to pass a data value from an outer portion of the nested program loop to an inner portion of the nested program loop.

5. A vector processor in accordance with claim 1, wherein the first input stream unit and the first output stream unit are configured to execute instructions in an outer portion of the nested program loop.

6. A vector processor in accordance with claim 1, wherein the first input stream unit further comprises an outer counter configured to count outer iterations of the nested program loop and wherein the output data validity tag is set to indicate that the output data value is invalid if the outer counter has expired.

7. A vector processor in accordance with claim 1, wherein the first output stream unit further comprises an outer counter that counts outer iterations of the nested program loop and wherein the first output stream unit is configured such that a data value is not sunk if the outer counter has expired.

8. A vector processor in accordance with claim 1, wherein the first input stream unit is configured to provide output data values to a plurality of data paths of an unrolled loop, and is further configured such that on a last iteration of the unrolled loop, the first input stream unit provides M outputs data values, where M is a number of inner iterations remaining as determined from the first inner counter.

9. A vector processor in accordance with claim 1, further comprising a second input stream unit configured to load a data value once per iteration of the inner loop and to output, to a data path, the data value and a data validity tag associated with the data value, the data validity tag indicating that the data value is valid.

10. A method of executing a nested program loop on a vector processor, the nested loop comprising an outer-pre portion, an inner portion and an outer-post portion, the method comprising:

providing a data value to a data path and setting an associated data validity tag to 'valid' once per outer loop iteration, as indicated by an inner counter;

setting the associated data validity tag to 'invalid' if the inner counter does not indicate a start of an inner loop;

performing functional operations on data values in the data path, each functional operation producing a valid result if the data validity tags associated with inputs data values are set to 'valid'; and sinking a data value from the data path once per outer loop iteration, as indicated by an inner counter, if an associated data validity tag indicates that the data value is valid.

11. A method in accordance with claim 10, wherein the nested program loop is executed on K parallel data paths, where K is greater than one, the method further comprising:

loading data values to L data paths of the K parallel data paths, where L is the minimum of K and the number of inner iterations remaining, as indicated by the inner counter.

12. A method in accordance with claim 11, further comprising, at each inner iteration of the nested loop:

tagging the data values loaded to the L data paths as valid;

tagging data values loaded to the other K-L data paths as invalid if K is greater than L; and executing the K parallel data paths.

13. A method in accordance with claim 10, further comprising:

storing a data value from an outer portion of the nested program loop in a data latch if a data validity tag associated with the data value indicates that the data value is valid;

setting the data validity tag associated with the stored data value to indicate that the stored data value is valid; and providing the stored data value and the associated data validity tag to the inner portion of the nested program loop.

14. A method in accordance with claim 13, further comprising:

setting the data validity tag associated with the stored data value to indicate that the stored data value is invalid when the inner counter indicates that the inner portion of the nested program loop is completed.

15. A method for providing a stream of data values to a data path of a vector processor configured to execute a nested program loop, the method comprising:

at each inner iteration of the nested loop:
updating an inner counter;
if the inner counter has a specified value:
retrieving a data value from a data source;
providing the data value to the data path; and
setting a data validity tag associated with the data value to indicate that the data value is valid;
otherwise, if the inner loop counter does not have the specified value:
setting the data validity tag associated with the data value to indicate that the data value is invalid; and
providing the data value and the associated data validity tag to the data path.

16. A method in accordance with claim 15, wherein the vector processor has K parallel data paths, where K is greater than one, the method further comprising:

at each inner iteration of the nested loop:
retrieving L data values from the data source, where L is the minimum of K and the number of inner iterations remaining, as indicated by the inner counter; and providing the L data values to L data paths of the K parallel data paths.

17. A method in accordance with claim 16, further comprising, at each inner iteration of the nested loop:
tagging the data values provided to the L data paths as valid;
tagging data values loaded to the other K-L data paths as invalid if K is greater than L; and
executing the K parallel data paths.

18. A method in accordance with claim 15, wherein the data path includes a data latch, the method further comprising:

at each inner iteration of the nested loop:
providing an input data value and an associated data validity tag to the data latch;
the data latch updating a stored data value with the input data value if the data validity tag of the input data value indicates that the input data value is valid; and
the data latch providing the stored data value to the data path.

* * * * *